(12) United States Patent
Adams et al.

(10) Patent No.: US 11,265,237 B2
(45) Date of Patent: Mar. 1, 2022

(54) SYSTEM AND METHOD FOR DETECTING DROPPED AGGREGATED TRAFFIC METADATA PACKETS

(71) Applicant: Arbor Networks, Inc., Westford, MA (US)

(72) Inventors: Andrew Lee Adams, Ann Arbor, MI (US); Cameron T. Hanover, Ann Arbor, MI (US)

(73) Assignee: Arbor Networks, Westford, MA (US)

( * ) Notice: Subject to any disclaimer, the term of this patent is extended or adjusted under 35 U.S.C. 154(b) by 0 days.

(21) Appl. No.: 16/885,000

(22) Filed: May 27, 2020

(65) Prior Publication Data

US 2020/0382397 A1 Dec. 3, 2020

Related U.S. Application Data

(60) Provisional application No. 62/854,050, filed on May 29, 2019.

(51) Int. Cl.
*G06F 15/173* (2006.01)
*H04L 43/0829* (2022.01)
*H04L 43/06* (2022.01)
*H04L 41/046* (2022.01)

(52) U.S. Cl.
CPC ........ *H04L 43/0829* (2013.01); *H04L 41/046* (2013.01); *H04L 43/06* (2013.01)

(58) Field of Classification Search
USPC ................. 709/223, 224, 236, 231
See application file for complete search history.

(56) References Cited

U.S. PATENT DOCUMENTS

2018/0262432 A1* 9/2018 Ozen ...................... H04L 12/18
2020/0112517 A1* 4/2020 Mena .................. H04L 43/0829

* cited by examiner

*Primary Examiner* — Lan Dai T Truong
(74) *Attorney, Agent, or Firm* — Locke Lord LLP; Scott D. Wofsy; Christopher J. Capelli

(57) ABSTRACT

A method includes receiving summary messages summarizing respective aggregated traffic metadata packets output from the at least one traffic management device and an engine. Each summary message identifies an origination pair having a traffic management device and an aggregation engine and a sequence number. The method further includes tracking per subinterval of a series of sub-intervals, highest and lowest sequence numbers and a count of summary messages received for each unique origination pair from the beginning of the subinterval. The method further includes accumulating, per interval, accumulated highest and lowest sequence numbers and an accumulated count of summary messages for each unique origination pair from the beginning of the interval and for all previous subintervals for tracking dropped aggregated traffic metadata packets for the interval. The method further includes estimating a number of dropped aggregated traffic metadata packets for the interval based on the accumulated highest and lowest sequence numbers and the count of summary messages.

20 Claims, 7 Drawing Sheets

State Transitions and Actions

SYSTEM AND METHOD FOR DETECTING DROPPED AGGREGATED TRAFFIC METADATA PACKETS

CROSS REFERENCE TO RELATED APPLICATIONS

This application claims priority to U.S. Patent Application Ser. No. 62/854,050 filed May 29, 2019 which is incorporated herein by reference in its entirety.

FIELD OF THE DISCLOSURE

This disclosure relates to monitoring network packets within network communication systems and, more particularly, to monitoring communication systems to detect dropped aggregated traffic metadata packets

BACKGROUND

It is useful for operators of communication networks to be alerted when aggregated traffic metadata packets (e.g., NetFlow packets or the equivalent) aggregated by a traffic management device (e.g., a router) and sent to a collecting device (hereafter called a collector) are dropped. Aggregated traffic metadata packets may be dropped for numerous reasons, such as network congestion or network outages. When aggregated traffic metadata packets are dropped due to network congestion, it is commonly referred to as 'dropped flow' or 'flow is being dropped'. For communication network systems that process aggregated traffic metadata packets, dropped flow can be detected by tracking monotonically increasing sequence numbers that appear in each aggregated traffic metadata packet. These sequence numbers can be inserted by one or more aggregation engines included in each traffic management device.

Determining if aggregated traffic metadata packets are being dropped is often complex. Aggregated traffic metadata packets are not guaranteed to arrive at a collector in the order that they were transmitted. A jump greater than one in sequence numbers of aggregated traffic metadata packets output by a given aggregation engine of a traffic management device (referred to as an origination pair) can be due to tardy aggregated traffic metadata packets, and therefore does not necessarily imply that an aggregated traffic metadata packet has been dropped.

In fact, in some methods of aggregation used by traffic management devices, aggregating traffic metadata packets can contain more than one record of metadata, with the sequence number of each aggregated traffic metadata packet being incremented by the number of records contained in the previous aggregated traffic metadata packet. In an effort to parallelize work over different CPU cores, complexity can increase when aggregated traffic metadata packets from a single origination pair are distributed to several cooperating collector processes for processing. A single collector process is likely to not see all the aggregated traffic metadata packets from a given origination pair. For instance, a collector process may become so overloaded that it is unable to properly process aggregated traffic metadata packets or summary messages summarizing aggregated traffic metadata packets. When this overload condition occurs, aggregated traffic metadata packets or the corresponding summary messages can be dropped, even after the aggregated traffic metadata packets have arrived at the collector. Although aggregated traffic metadata packets or their summary messages that are dropped after the aggregated traffic metadata packets have been accepted by the collector are not considered dropped aggregated traffic metadata packets, it is very useful to know when such an event has occurred.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method is provided of determining dropped aggregated traffic metadata packets that were output from at least one traffic management device to at least one collector device. The method includes receiving summary messages summarizing respective aggregated traffic metadata packets output from the at least one traffic management device and an engine. Each traffic management device includes at least one engine. Each summary message corresponds to one of the aggregated traffic metadata packets and identifies an origination pair and a sequence number assigned by the origination pair. The origination pair includes a traffic management device of the at least one traffic management device and an engine of the traffic management device from which the aggregated traffic metadata packet was output. The method further includes tracking per subinterval of a series of sub-intervals, highest and lowest sequence numbers and a count of summary messages received for each unique origination pair from the beginning of the subinterval, wherein each series of subintervals is included within a respective interval of a series of intervals. The method further includes accumulating, per interval, accumulated highest and lowest sequence numbers and an accumulated count of summary messages for each unique origination pair from the beginning of the interval and for all previous subintervals of the series of subintervals included in the interval for tracking dropped aggregated traffic metadata packets for the interval. The method further includes estimating a number of dropped aggregated traffic metadata packets for the interval based on the accumulated highest and lowest sequence numbers and the count of summary messages.

In accordance with one or more embodiments, the method can further include receiving a data lost notification for one of the subintervals, the data lost notification indicating a data lost event in which information regarding one or more aggregated traffic metadata packets was knowingly discarded from one of the received summary messages due to a full condition of a channel by which the summary messages are received. The method can further include adjusting the tracked highest and lowest sequence numbers and a count of summary messages for the subinterval to indicate that the aggregated traffic metadata packets were not dropped during the subinterval.

In accordance with one or more embodiments, the method can further include changing states of a state machine to handle and recover from receiving a data lost indication.

In accordance with one or more embodiments, tracking during a current subinterval of a series of subintervals can include attributing a received aggregated traffic metadata packet to either the current subinterval or a previous subinterval of the series of subintervals that precedes the current subinterval based on a comparison of the sequence number of the aggregated traffic metadata packet to the highest sequence number of any of the previous subintervals of the series of subintervals.

In accordance with one or more embodiments, accumulating during a current interval of the series of intervals for a unique origination pair can include updating the accumulated highest and lowest sequence numbers and the accumulated count of summary messages using the highest and lowest sequence numbers and a count of summary messages at the end of each subinterval of the series of subintervals included in the current interval that is not a first subinterval of the series of subintervals included in the current interval.

In accordance with one or more embodiments, accumulating during a current interval of the series of intervals for a unique origination pair can include clearing the accumulated highest and lowest sequence numbers and the accumulated count of summary messages at the end of a first subinterval of the series of subintervals included in the current interval.

In accordance with one or more embodiments, estimating the number of dropped aggregated traffic metadata packets for the interval can include setting, for a unique origination pair, an expected summary messages value to equal a difference between the accumulated highest and lowest sequence numbers incremented by one of the unique orientation pair, and totaling, for the unique origination pair, for the subintervals included in the interval, a difference between the expected summary messages value and the accumulated count of summary messages.

In accordance with one or more embodiments, the method can further include processing the summary messages received, outputting telemetry data about the aggregated traffic metadata packets based on information determined by processing the summary messages, and adjusting an action applied for managing or monitoring network traffic based on the telemetry data.

In accordance with aspects of the disclosure, a system is provided to perform the method of the disclosure. Furthermore, in accordance with aspects of the disclosure a non-transitory computer readable storage medium and one or more computer programs stored therein, the computer programs comprising instructions, which when executed by a computer system, cause the computer system to perform the method of the disclosure.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
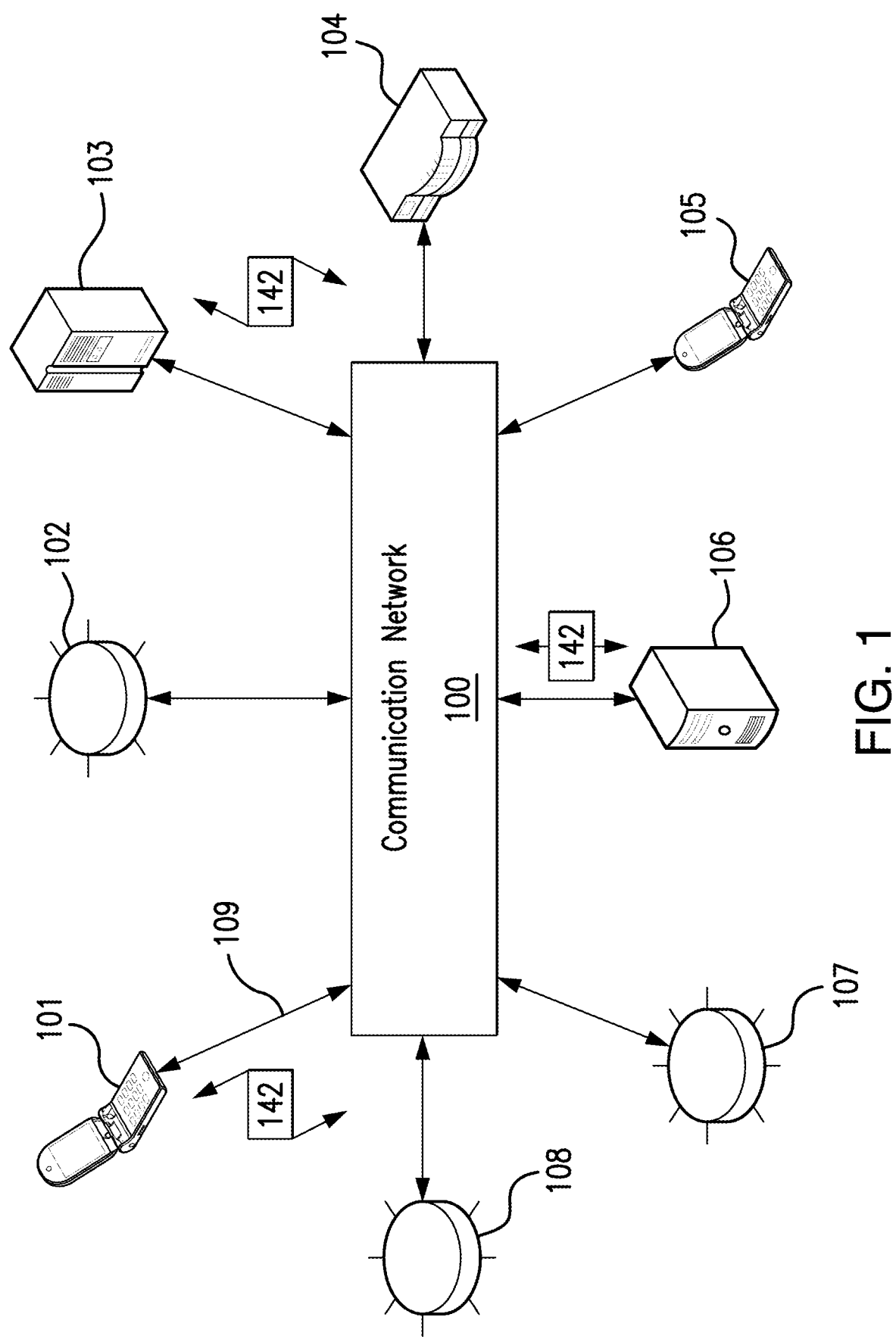
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either or both of those included limits are also included in the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, packet analyzer device 104, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 2:
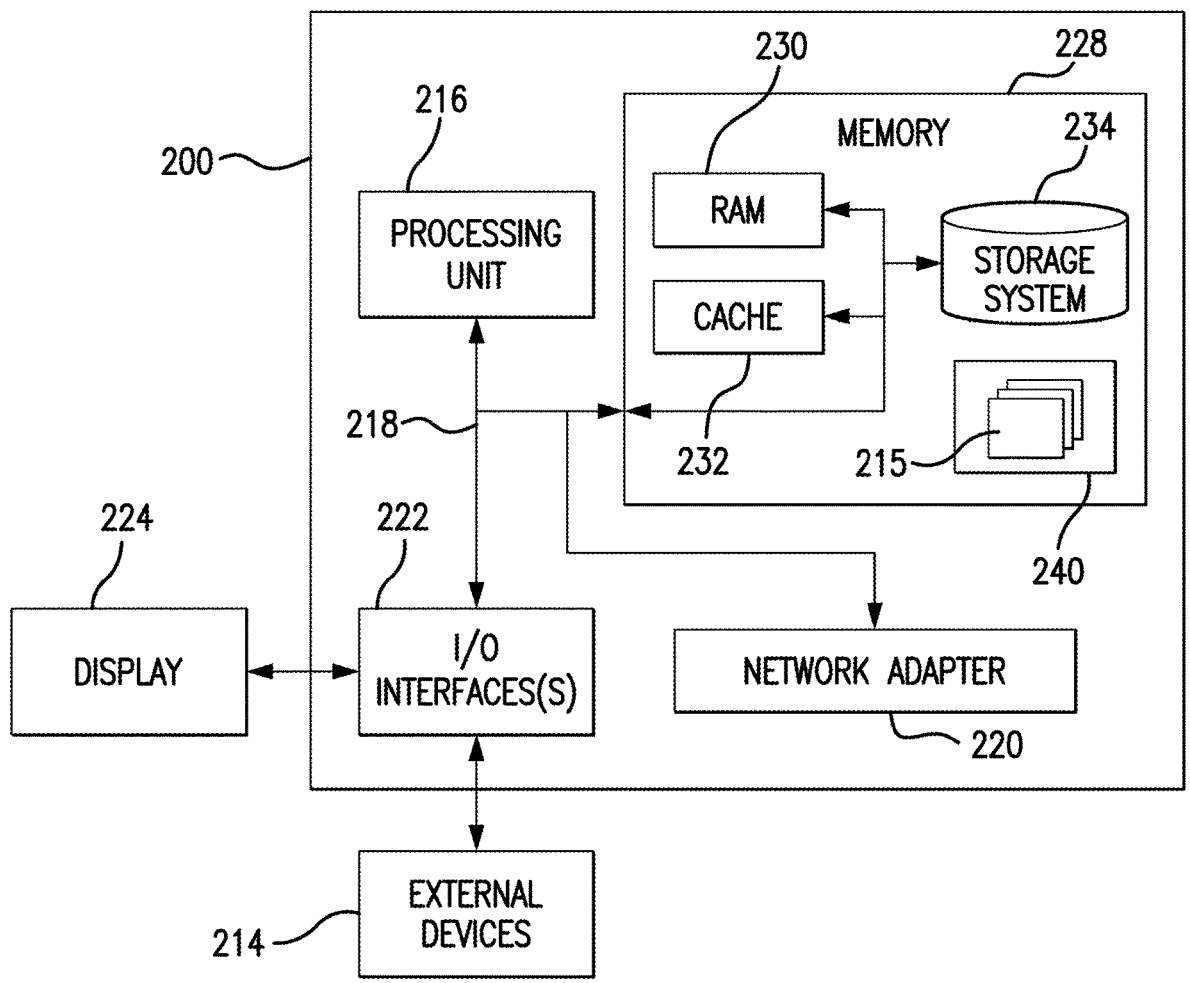
FIG. 2 illustrates an example network device/node coupled to the communication network of FIG. 1.

FIG. 2 is a schematic block diagram of an example network computing device 200 (e.g., client computing device 103, packet analyzer device 104, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present disclosure. Device 200 is only one example of a suitable system and is not intended to suggest any limitation as to the scope of use or functionality of embodiments of the disclosure described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the disclosure as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present disclosure will now be provided with reference to the packet analyzer device 104 of FIG. 1, which as described below is configured and operational to alert a network operator that aggregated traffic monitoring on which they are relying is unreliable due to either a problem in the network or to processes on a collector that receives aggregated traffic metadata packets being overloaded, in accordance with the described embodiments.

Figure 3:
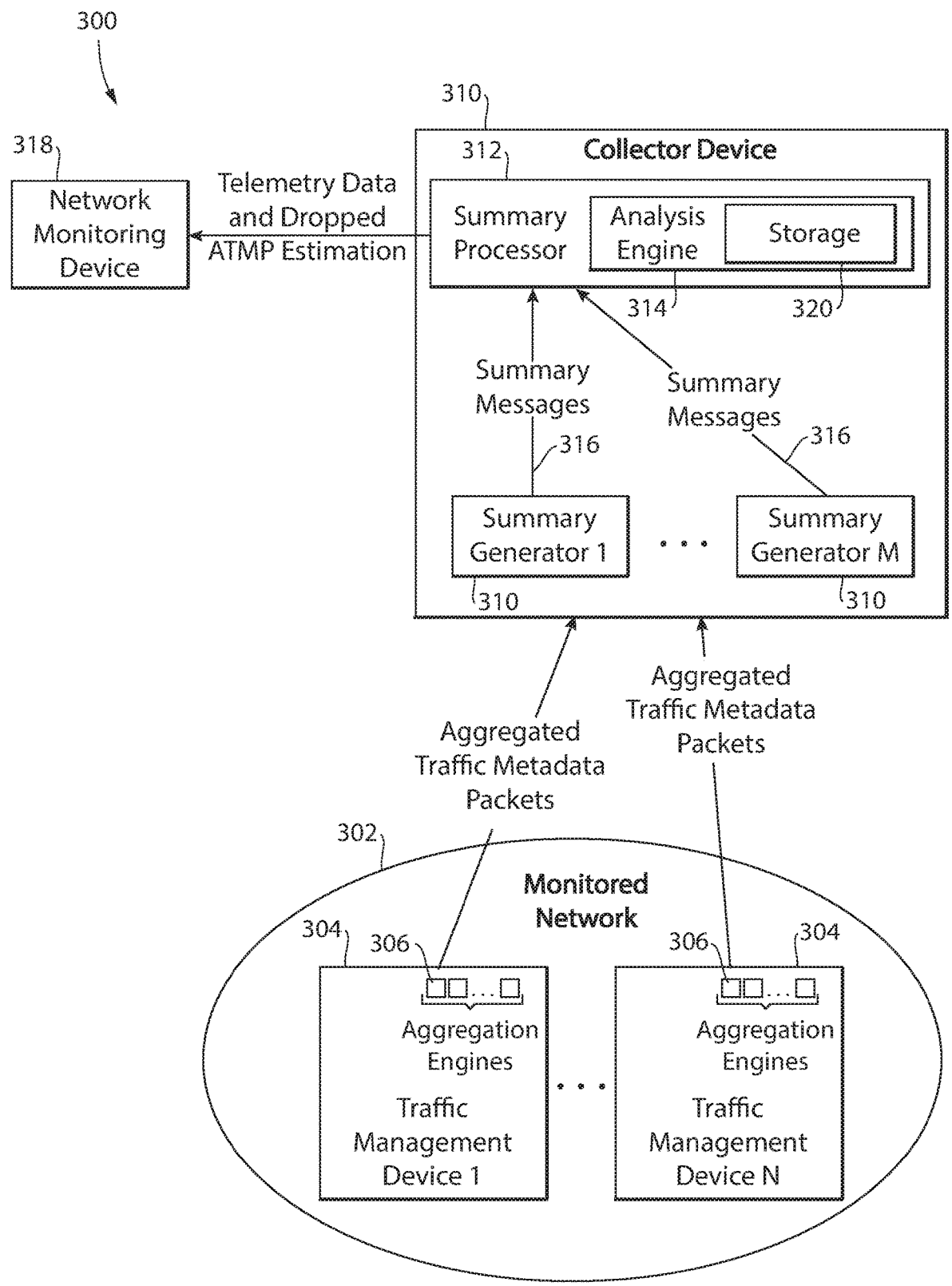
FIG. 3 illustrates an example network monitoring system having a collector device that receives aggregated traffic metadata packets from a traffic management device.

With reference to FIG. 3, for purposes of explanation and illustration, and not limitation, a block diagram of an exemplary embodiment of a network monitoring system in accordance with the disclosure is shown in FIG. 3 and is designated generally by reference character 300. Other embodiments of the network monitoring system 300 in accordance with the disclosure, or aspects thereof, are provided in FIGS. 4-9, as will be described.

Network monitoring system 300 includes one or more traffic management devices 304 monitoring a network 302 (shown as traffic management devices 1-N). Each traffic management device 304 includes one or more aggregation engines 306 that generate aggregated traffic metadata packets based on network traffic (not shown, but sent from a source endpoint to a destination endpoint) traversing traffic management device 304. Each aggregated traffic metadata packet thus originates from a pair of a particular engine 306 of a particular traffic management device 304, wherein the pair is referred to as an origination pair.

Monitored network 302 represents a network of monitored devices (not shown) that communicate with one another and/or with an external network (not shown) via one or more wired and/or wireless external communication links (not shown), wherein communication to and/or from the monitored devices is monitored by at least one of the traffic management device 304 and a collector device 308, and possibly further monitoring devices, such as network monitoring device 318.

The monitored devices are computing devices having hardware, software and/or firmware, such as servers, laptop devices, mobile devices (e.g., laptops, smartphones, cell phones, and tablets), network elements (e.g., routers, switches, and firewalls), embedded computer devices that are embedded in other devices (e.g., appliances, tools, vehicles, or consumer electronics).

Monitored network 102 and the external network (not shown) can include one or more networks, such as an intranet, a local area network (LAN), and/or a wide area network (WAN). In examples, monitored network 102 can be an enterprise network, such as a school network, business network, and government network, to list a few examples, that can connect to the Internet. The external network is external to monitored network 102 and can be included in the Internet.

Traffic management device 304 can be, for example, a router, switch, probe, or device that is traversed by network traffic being routed from a source endpoint to a destination endpoint. The traffic management device 304 can, for example, route the network traffic, manage flow of the network traffic, or merely capture packets of the network traffic. Aggregation engines 306 aggregate information about the network traffic to generate aggregated traffic metadata packets.

Each traffic management device 304 can be embodied as a device 200 that includes one or more processors or processing units 216 configured to execute instructions stored by system memory 228 a memory. The aggregation engines 306 provided in a particular traffic management device 304 can use one processor or multiple processors, e.g., parallel processor cores.

An example traffic management device 304 can be a router that includes one or more engines 306 enabled to use NetFlow, a network protocol developed by CISCO™ for collecting information (referred to as Flow data) about network traffic and monitoring the network traffic, wherein the aggregated traffic metadata packets can be referred to as NetFlow data. The aggregation engines 306 can be configured to provide the NetFlow capability.

Additional examples of protocols for aggregating the network traffic that could be used by engines 306 include Jflow™, NetStream™, AppFlow™, and sFlow™. The aggregated traffic metadata packets include information such as, among other things: traffic sender address, traffic receiver address, number of packets transmitted, protocol used, traffic management device (e.g., a router) ingress and egress interfaces.

Network monitoring system 300 further includes collector device 308 having a summary generator 310, a summary processor 312, and an analysis engine 314. The summary generator 310 receives the aggregated traffic metadata packets from engines 306 of the one or more traffic management devices 304 and generates summary messages. Each summary message corresponds to one aggregated traffic metadata packet and includes selected information that is provided in a summary message to the summary processor 312 via summary channels 316. The summary processor 312 processes the summary messages to determine measurements and characteristics of the network traffic, and output results of this processing as telemetry data to a network monitoring device 318.

The network monitoring device 318 relies on the telemetry data to monitor the network traffic and apply actions, such as for threat management, load balancing, managing alerts, identifying and attending to malfunctions, etc. The determination of which actions to apply by the network monitoring device 318 can depend on a confidence level associated with the telemetry data. For example, if the telemetry data indicates that a particular condition exists that warrants that the network monitoring device 318 set an alert or request an intervention, when the confidence level is low, the network monitoring device 318 may refrain from setting the alert or requesting the intervention.

The analysis engine 314 analyzes the summary messages and determines an estimate of dropped aggregated traffic metadata packets. Analysis engine 314 further accesses storage 320, which can be internal or external to the analysis engine 314 and/or the collector device 308. The estimation of dropped aggregated traffic metadata packets (ATMP) is also provided to network monitoring device 318 in addition to the telemetry data. The estimation of dropped ATMP can be used by the monitoring device 318 to adjust the confidence level of the telemetry data. Accordingly, a rise or fall of the estimation of dropped ATMP causes the network monitoring device 318 to adjust the actions it takes.

With reference now to FIGS. 4-7, shown are flowcharts demonstrating implementation of the various exemplary embodiments. It is noted that the order of blocks shown in FIGS. 4-7 is not required, so in principle, the various blocks may be performed out of the illustrated order. Also, certain blocks may be skipped, different blocks may be added or substituted, some blocks may be performed in parallel instead of strictly sequentially, or selected blocks or groups of blocks may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

Figure 4:
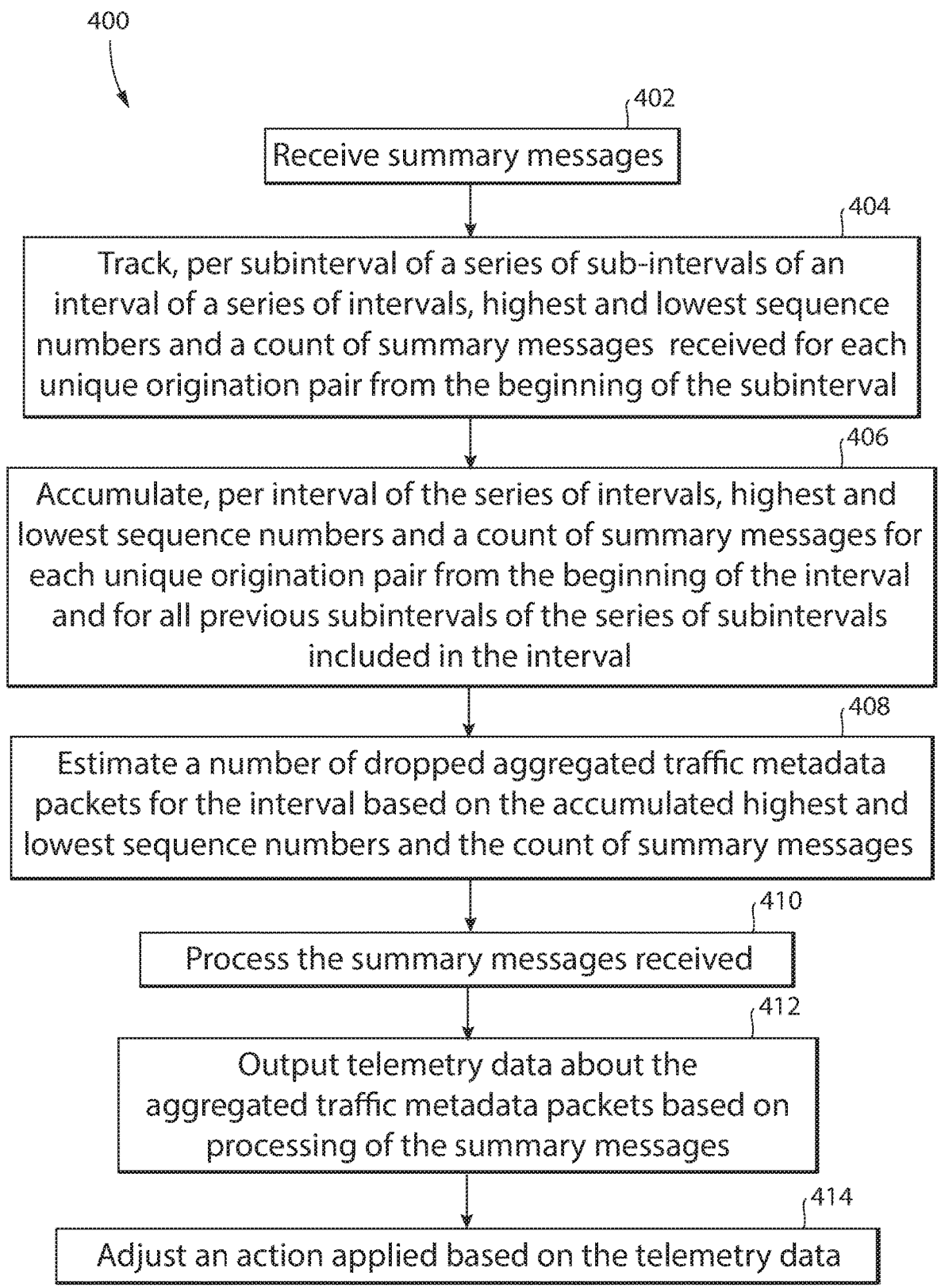
FIGS. 4-7 illustrate example flowcharts showing an example method performed by an example analysis engine of the collector device shown in FIG. 1, in accordance with an aspect of the disclosure.

FIG. 4 shows a flowchart 400 of blocks performed by an analysis engine, such as analysis engine 314 shown in FIG. 3. At block 402, summary messages are received, wherein the summary messages summarize respective aggregated traffic metadata packets output by one or more one traffic management device, such as traffic management devices 304. Each summary message is output by one of the traffic management devices and an engine of one or more engines of the traffic management device. Each summary message corresponds to one of the aggregated traffic metadata packets and identifies an origination pair and a sequence number assigned by the origination pair, wherein the origination pair includes the traffic management device of and the engine from which the aggregated traffic metadata packet was output.

At block 404, highest and lowest sequence numbers and a count of summary messages received are tracked for each unique origination pair from the beginning of a subinterval. Tracking is performed per subinterval of a series of subintervals of an interval of a series of intervals.

At block 406, highest and lowest sequence numbers and a count of summary messages are accumulate for each unique origination pair per interval of the series of intervals. The highest and lowest sequence numbers and a count of summary messages are accumulated from the beginning of the interval and for all previous subintervals of the series of subintervals included in the interval.

At block 408 a number of dropped aggregated traffic metadata packets flows is estimated for the interval based on the accumulated highest and lowest sequence numbers and the count of summary messages.

In one or more embodiments, implementation of the method can further include blocks 410-414. At block 410, the summary messages that were received are processed. At block 412, telemetry data about the aggregated traffic metadata packets is output. The telemetry data is based on information determined by processing the summary messages. At operation 414, an action applied for managing or monitoring the network traffic is adjusted based on the telemetry data. Actions can include threat management, load balancing, managing alerts, identification of and attendance to malfunctions, etc.

Figure 5:
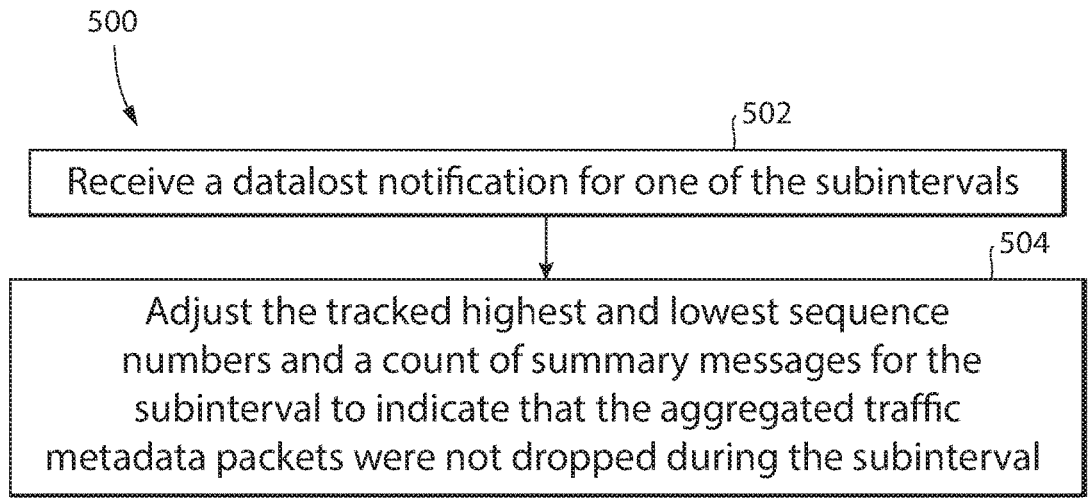

With reference to FIG. 5, flowchart 500 shows a method performed by the analysis engine for responding to a data lost notification. At block 502, a data lost notification is received for one of the subintervals. At block 504, the tracked highest and lowest sequence numbers and a count of summary messages are adjusted for the subinterval to indicate that the aggregated traffic metadata packets were not dropped during the subinterval.

Figure 6:
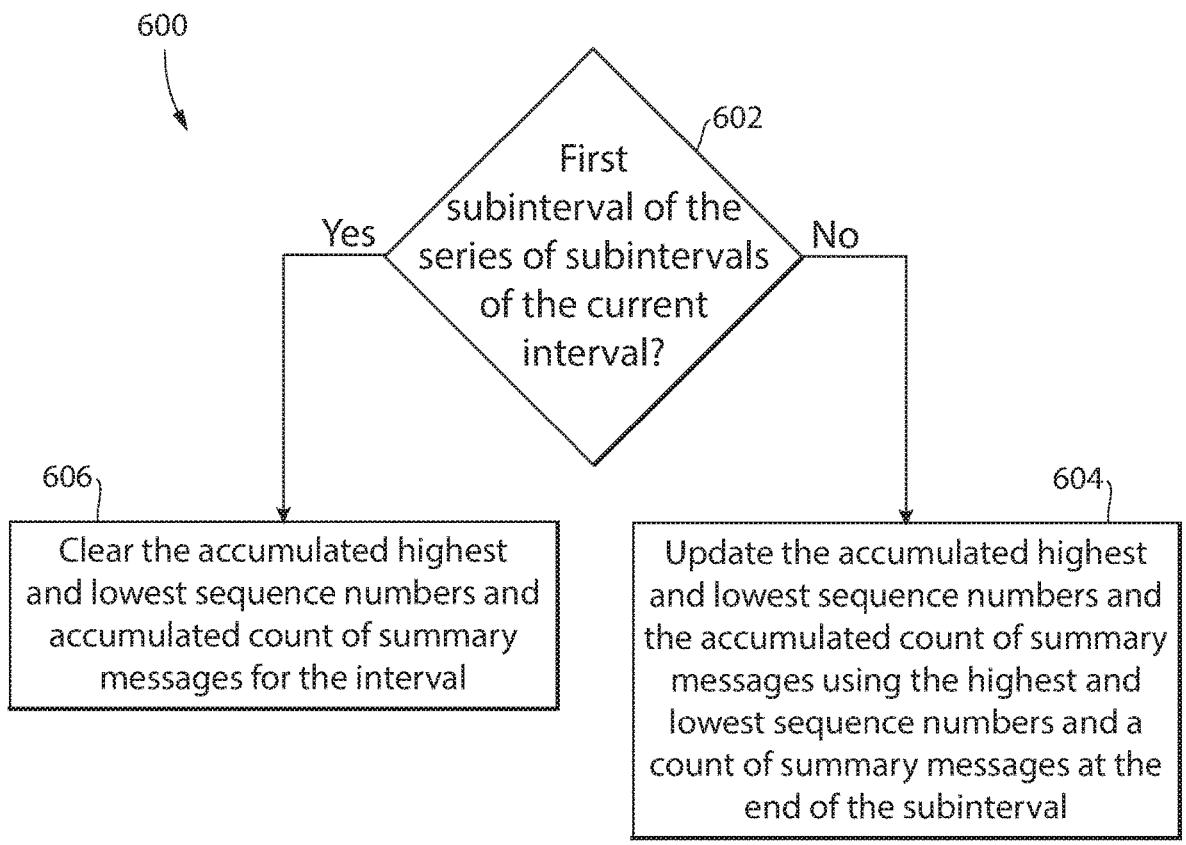

With reference to FIG. 6, flowchart 600 shows a method of performing block 406 is shown in greater detail in accordance with one or more embodiments. When performing block 406 for a unique origination pair of a particular interval (referred to as the current interval), the method shown in flowchart 600 is applied to each subinterval of the series of subintervals included in the current interval. At block 602, a determination is made whether the subinterval is the first subinterval of the series of subintervals. If the determination is that NO, meaning the subinterval is not the first subinterval of the series, then at block 604, at the end of the subinterval, the accumulated highest and lowest sequence numbers and the accumulated count of summary messages are updated using the highest and lowest sequence numbers and a count of summary messages. Else, if the determination at block 602 is YES, meaning the subinterval is the first subinterval of the series, then at block 606, at the end of the subinterval, the accumulated highest and lowest sequence numbers and the accumulated count of summary messages are cleared.

Figure 7:
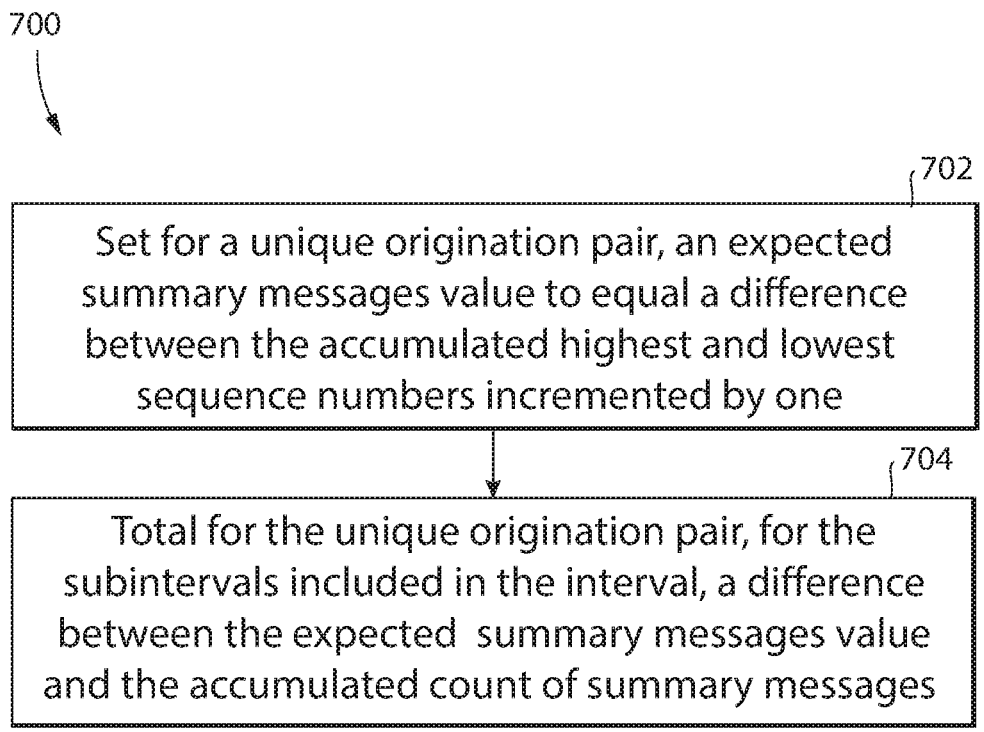

With reference to FIG. 7, flowchart 700 shows a method of performing block 408 is shown in greater detail in accordance with one or more embodiments. The method shown in flowchart 700 is applied to the current interval. At block 702, setting, for a unique origination pair, an expected summary messages value is set for a unique orientation pair to equal a difference between the accumulated highest and lowest sequence numbers incremented by one of the unique orientation pair. At block 704, a difference between the expected summary messages value and the accumulated count of summary messages is totaled for the unique origination pair for the subintervals included in the interval, Accordingly, the analysis engine 314 shown in FIG. 3 performs a process that tracks sequence numbers of aggregated traffic metadata packets received from traffic management devices 304 and reports a number of aggregated traffic metadata packets that never arrived. At the end of each interval (a fixed interval, also referred to as reporting interval), counters are cleared and the detection of missing aggregated traffic metadata packets begins again. The analysis engine 314 can be integrated in a summary processor 312, including (but not limited to) when processing of aggregated traffic metadata packets is parallelized by aggregated traffic metadata packets to multiple processes (summary generators 310), for example in a round-robin process.

The process performed by the analysis engine 314 distinguishes between packets lost in a network and those discarded by overloaded 'feeder' processes. The analysis engine 314 can distinguish the difference between a lost aggregated traffic metadata packet and a tardy aggregated traffic metadata packet. Additionally, analysis engine 314 can infer dropped aggregated traffic metadata packets from sequence numbers aggregated from multiple collector devices 308.

It is to be appreciated that the description of the collector device 308 utilizing the analysis engine 314 in accordance with the present disclosure assumes, for exemplary purposes, that individual aggregated traffic metadata packets from network 100 contain a record, and that the sequence number included in each aggregated traffic metadata packets is one greater than the previous aggregated traffic metadata packets emitted by the same traffic management device 304 and aggregation engine 306. The term record refers to a single exchange of messages traversing the traffic management device 304 between two network devices.

Figure 8:
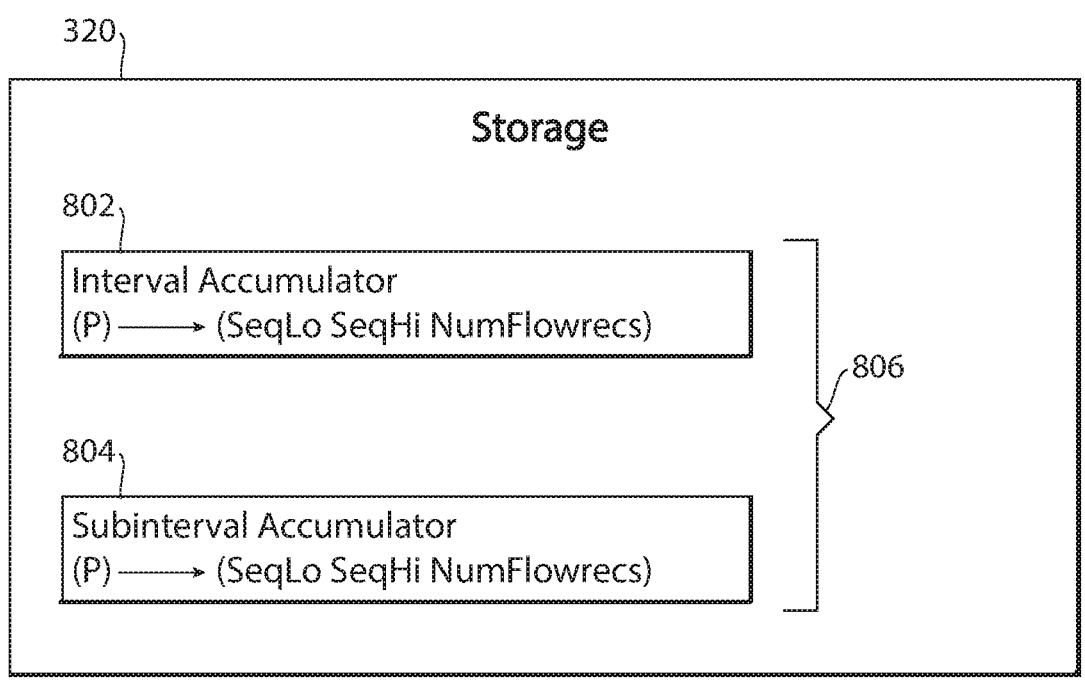
FIG. 8 illustrates storage with accumulators accessed by the analysis engine, in accordance with an aspect of the disclosure.

With reference to FIG. 8, storage 320 stores an interval accumulator 802 and a subinterval accumulator 804. Interval accumulator 802 and subinterval accumulator 804 are referred to as accumulators 806. The analysis engine 314 divides the reporting interval into three or more equally sized subintervals. Interval accumulator 802 and subinterval accumulator 804 track data for each unique origination pair observed in the summary messages. In the example shown, the data tracked by the interval accumulator 802 and the subinterval accumulator 804 includes SeqLo, SeqHi, and NumFlowrecs, without limitation to this specific data. One interval accumulator 804 is maintained and multiple subinterval accumulators 806 are maintained for each origination pair entry 802. Interval accumulator 802 tracks data for the current interval and subinterval accumulator 804 tracks data for the current subinterval. In the example shown, there are three subintervals per interval, however the disclosure is not limited to three subintervals, and can include more than three subintervals.

Definitions

Interval Accumulator 804

Triple (SeqLo, SeqHi, NumFlowrecs) is maintained for every origination pair entry 802 (e.g., for pair (traffic management device (TM) ID, aggregation engine ID)) observed in the summary messages since the beginning of an interval.

SeqLo

SeqLo is the lowest sequence number observed in summary messages for an origination pair since the beginning of the interval.

SeqHi

SeqHi is the highest sequence number observed in summary messages for an origination pair since the beginning of the interval.

NumFlowrecs

NumFlowrecs is a count of the number of summary messages received for an origination pair since the beginning of the interval.

It is to be appreciated the aforesaid interval accumulator 804 can be a map that maps the origination pair to the triple (SeqLo, SeqHi, NumFlowrecs).

Subinterval Accumulator 806

Triple (SeqLo, SeqHi, NumFlowrecs) is maintained for every origination pair observed in the summary messages since the beginning of a subinterval.

SeqLo

SeqLo is the lowest sequence number observed in summary messages for an origination pair since the beginning of the subinterval.

SeqHi

SeqHi is the highest sequence number observed in summary messages for an origination pair since the beginning of the subinterval.

NumFlowrecs

NumFlowrecs is a count of the number of summary messages received for an origination pair since the beginning of the subinterval.

It is to be appreciated the aforesaid subinterval accumulator 806 can be a map that maps the origination pair to the triple (SeqLo, SeqHi, NumFlowrecs).

The subinterval accumulator 804 can maintain statistics about summary messages that belong to the current subinterval. The interval accumulator 802 maintains aggregated statistics about summary messages that belong to all previous subintervals of the current interval. Note however that these statistics are aggregated over all previous subintervals of the current interval (e.g., the interval accumulator 802 does not remember to which subinterval a summary message belongs, nor does it remember the precise details of the individual summary messages).

A purpose for dividing a reporting interval into subintervals is to introduce hysteresis into generation of dropped flow estimates. Preferably, the dropped flow estimate generated by analysis engine 314 does not use data (e.g. SeqLo, SeqHi, NumFlowrecs) collected during the current subinterval. Consider the time interval beginning with an aggregated traffic metadata packet being emitted by a traffic management device 304, during which a summary generator 310 generates a summary message for the aggregated traffic metadata packet, and ending with that summary message being received as input to the analysis engine 314. It is to be understood the length of this time interval is referred to as "T", which is the time between an aggregated traffic metadata packet being emitted by a traffic management device 304 and a corresponding summary message being received by summary processor 312. The subinterval length is preferably chosen such that the probability that T is larger than the subinterval length is 'sufficiently close' to zero. By choosing the subinterval this way, a strong probability exists that when the current subinterval ends, all of the aggregated traffic metadata packets emitted during the previous subinterval have been received. Thus, if there are summary messages corresponding to aggregated traffic metadata packets emitted by a traffic management device 304 during the most-recently ended subinterval which have not yet been processed by the analysis engine 314, a likely reason for their absence is that those aggregated traffic metadata packets were lost in transit to the collector device 308.

Steady State Operation

Described below is a method in accordance with one or more embodiments of the disclosure of how state of the accumulators 806 is updated when the accumulators 806 are in steady state (ignoring the possibility of a full summary channel 316).

Processing a Summary Message

As discussed above, it is to be appreciated a summary message is a triple: (TM device ID, aggregation engine ID, SeqNum). When a summary message for an origination pair is received, an attempt is made to determine if the sequence number of the summary message is attributed to the current subinterval or to a previous subinterval. In a first approximation, if it is determined that the sequence number is less than SeqHi observed over the previous subintervals (which is determined by looking at the data maintained by the interval accumulator 802 for origination pair (P)), then the summary message is determined to belong to the previous interval. Furthermore, if SeqNum is also less than the SeqLo observed by the interval accumulator 802, then the value of SeqLo is lowered by setting it to SeqNum. In any case, the value of NumFlowrecs maintained by the interval accumulator 802 is incremented by 1.

On the other hand, if SeqNum is determined to be larger than the value of SeqHi observed by the interval accumulator 802, then the summary message is attributed to the current subinterval and state associated with the subinterval accumulator 806 for the origination pair (P) is updated. Subinterval accumulator 804 is updated by incrementing NumFlowrecs by 1 and updating SeqLo to be SeqNum if SeqNum<SeqLo, or updating SeqHi if SeqNum>SeqHi.

The End of Subintervals Other than the First Subinterval

It is to be understood, at the end of each subinterval other than the first subinterval of any given interval, the contents of the subinterval accumulator 804 are merged into the interval accumulator 802. For the origination pair referenced in the subinterval accumulator 804, the corresponding entry in the interval accumulator 802 is updated. The NumFlowrecs of the interval accumulator 802 is incremented by the value for the corresponding entry in the subinterval accumulator 804. Similarly, the values of SeqLo and SeqHi are updated as appropriate (e.g., if a 'higher high' or a 'lower low' was observed in the subinterval). In the common case, the SeqHi values of the interval accumulator 802 are set to the corresponding values of SeqHi of the subinterval accumulator 804. When updates to the interval accumulator 802 are complete, the state of the subinterval accumulator 804 is reset—all entries are purged.

The End of the First Subinterval

At the end of the first subinterval of any given interval, the state of the interval accumulator 802 is reset by purging all entries. The state of the subinterval accumulator 804 are then copied into the interval accumulator as described above.

Estimating Dropped Flows

A calculation to estimate the number of Flows dropped so far in the current interval for a given Flow Device preferably proceeds as follows.

estimate:=0 for each engine ID associated with the Flow Device in the Interval Accumulator

If (seqHi==SeqLo) {

During the interval only one sample referencing this (Flow Device,

Engine ID) was received. We cannot claim flows were dropped continue;

} samplesExpected:=SeqHi−SeqLo+1 lostForEngine:=samplesExpected−NumFlowrecs estimate:=estimate+lostForEngine

It is to be appreciated that since the interval accumulator 802 is being interrogated, and not the subinterval accumulator 804, the source of data for the estimate preferably originates from information collected for subintervals that are older than the current subinterval. Data collected for and attributed to the current subinterval never contributes to the estimate. Additionally, if a request is received to generate an estimate when the current subinterval is the first subinterval of an interval, the estimate will draw on data collected during and/or attributed to the previous interval.

Full Summary Channel

With many communications channels the possibility exists for data to accumulate faster than it can be consumed by a receiver. The system described here is no exception to this—the summary generators 310 generating summary messages could, conceivably, generate the summary messages faster than the summary messages can be consumed by summary processor 312. This condition is referred to as a full summary channel condition. It is to be appreciated that it is not possible for a summary generator 310 to order a traffic management device 304 to generate fewer aggregated traffic metadata packet, and buffering of summary messages by a summary generator 310 would postpone the problem (and merely transfer responsibility for the problem). One preferred method to process a full summary channel condition is for the summary generator 310 to discard samples while the summary channel 316 is full and then, when the summary channel 316 becomes available, send an indication on the summary channel 316 that samples have been dropped—this indication is referred to as a data lost event. Generation of a data lost event signals to summary processor 312 that the data that the analysis engine 314 relies on to estimate dropped flows is incomplete. Accordingly, in addition to processing summary messages, the analysis engine 314 also processes data lost events. In response to a data lost event, the analysis engine 314 enters a recovery mode, which enables exclusion of data accumulated over the subinterval in which the data lost event occurred. The analysis engine 314 may also process multiple, contiguous subintervals, each of which witnessed one or more data lost events. A subinterval in which one or more data lost events occurs is referred as being "dirty."

It is to be appreciated that if the analysis engine 314 observes a data lost event during a subinterval, then the unaccounted for sequence numbers given by NumFlowrecs−(SeqHi−SeqLo+1) cannot be completely classified, since there is no way to know what fraction of the missing sequence numbers are missing due to packets lost in the network traffic and what fraction are missing due to having been discarded due to a full summary channel condition. This count of unclassifiable missing sequence numbers is accounted for in any estimate of flows dropped over the reporting interval, and does not contribute to an increase of the estimate.

As mentioned above, the NumFlowrecs, SeqHi and SeqLo are recorded per unique origination pair. Note that during a subinterval in which a data lost event occurred, it will be the case that for many origination pairs, NumFlowrecs−(SeqHi−SeqLo+1) will equal 0.

The analysis engine 314 processes data lost events as follows. If a subinterval witnessed a data lost event, then analysis engine 314 enters recovery mode. During this dirty subinterval, the analysis engine 314 operates as if no aggregated traffic metadata packets are dropped. In this way, aggregated traffic metadata packets that were received, but for which a collector device 308 could not generate a summary message, do not contribute to the count of missing aggregated traffic metadata packets. A side effect of this is that aggregated traffic metadata packets that have truly gone missing in the network are undetected. But since there is no way for summary processor 312 to distinguish these cases, ignoring missing aggregated traffic metadata packets is overall beneficial. And once an entire subinterval passes during which no data lost events were witnessed, the analysis engine 314 exits recovery mode.

It is to be appreciated that while the analysis engine 314 may maintain a per-engine count of the sequence numbers that were ignored during dirty subinterval. The alternative to ignoring only the data collected during dirty subintervals is to ignore all of the data collected during the entire interval. When ignoring only dirty subintervals, a finite state machine is used to manage transitions into and out of recovery mode. The current state of this state machine is consulted when processing a new summary sample so as to know if NumFlowrecs is incremented by one, or simply set to be SeqHi−SeqLo+1.

The following are details about the algorithm and state machine (referred as a DataLost Finite State Machine) implemented by analysis engine 314.

Global State
  DataLostFSMState
    This is the current state of the DataLost Finite State Machine
  NumClockTicksPerSubInterval
    This is the configured number of clock ticks per subinterval.
  NumSubIntervalsPerInterval
    This is the configured number of subintervals comprising an interval.
  NumClockTicks
    This is a count of the number of clock ticks of a system clock (not shown) that the algorithm has witnessed. A tick is delivered by the system clock at a constant rate, e.g., every second, 5 seconds, 500 ms, etc.

State Maintained Per Origination Pair (TM Device ID, Aggregation Engine ID)
  Interval Accumulator
    SeqLo
    SeqHi
    NumFlowrecs
  Subinterval Accumulator
    SeqLo
    SeqHi
    NumFlowrecs Processing Clock Ticks The analysis engine 314 assumes the existence of an external clock source that sends 'tick' events at a fixed frequency. The pseudocode below describes how analysis engine 314 updates state in response to clock ticks.

Function Tick( )

---

```
NumClockTicks := NumClockTicks + 1
if (referring to beginning the second subinterval of the current interval) {
clear the Interval Accumulators for all (TM device ID, aggregation engine ID)
origination pairs }
# Iterate over all Subinterval Accumulators, copying their contents
# into a corresponding Interval Accumulator
```

```
for each Subinterval Accumulator, a_subint {
    if no Interval Accumulator exists for (TM device ID, aggregation engine ID) to
    which a_subint corresponds, then create one.
    Let a_int be the Interval Accumulator corresponding to (TM device ID,
    aggregation engine ID) associated with a_subint.
    if a_int.SeqLo > a_subint.SeqLo {
        a_int.SeqLo := a_subint.SeqLo
    }
    if a_int.SeqHi < a_subint.SeqHi {
        a_int.SeqHi := a_subint.SeqHi
    }
    a_int.NumFlowrecs := a_int.NumFlowrecs + a_subint.NumFlowrecs
}
```

Processing Summary Sample Messages
function sample_is_late(TM device ID, aggregation engine ID, seqNum)
    a_int:=retrieve Interval Accumulator for (TM device ID, aggregation engine ID))
    if a_int does not exist
    return false
    if seqNum<a_int.SeqHi
    Return true
Function Update_Range(Accumulator, seqNum)

```
# accumulator can be either an Interval Accumulator or a Subinterval
# Accumulator
if seqNum > accumulator.SeqHi {
    accumulator.SeqHi = SeqHi
}
if seqNum < accumulator.SeqLo {
    accumulator.SeqLo = SeqLo
}
```

Function Add_Sample(TM Device ID, Aggregation Engine ID, seqNum)

```
if sample_is_late(TM device ID, aggregation engine ID, seqNum){
    accum := retrieve Interval Accumulator for (TM device ID, aggregation engine
    ID)
} else {
    accum := retrieve Sub-interval Accumulator for (TM device ID, aggregation
    engine ID)
    if a_int does not exist, then create and initialize a_int
}
# 'DataLostFSMState' stores the current state of the DataLost Finite
# State Machine
if DataLostFSMState is OK {
    if NOT sample_is_late(TM device ID, aggregation engine ID, seqNum) {
        update_range(accum, seqNum)
    }
    accum.NumFlowrecs := accum.NumFlowrecs + 1
} else if DataLostFSMState is DATA_LOST {
    if sample_is_late(TM device ID, aggregation engine ID, seqNum) {
        accum.NumFlowrecs := accum.NumFlowrecs + 1
    } else {
        update_range(accum, seqNum)
    }
} else if DataLostFSMState is RECOVERING {
    if NOT sample_is_late(TM device ID, aggregation engine ID, seqNum) {
        update_range(accum, seqNum)
    }
    accum.NumFlowrecs := accum.NumFlowrecs + 1
}
```

Processing DataLost Messages

This section describes the DataLost Finite State Machine (FSM) that permits the algorithm implemented by analysis engine 314 to manage Full Summary Channel conditions.

State Machine States
Ok
    This is the initial state of the FSM, and the state to which the FSM returns after the first 'clean' subinterval.
DataLost
    The state machine is not in the process of recovering from a Data Lost event; i.e. no Data Lost events have been seen thus far during the current subinterval.
Recovering
    The state machine has received a Data Lost event during the current subinterval and is recovering.
State Machine Events
Tick
    This is the tick of the clock that indicates that a new subinterval is starting.
Lost
    Indicates that the Flow Sample generator (ted) had to discard one or more Flow Sample summaries.

Figure 9:
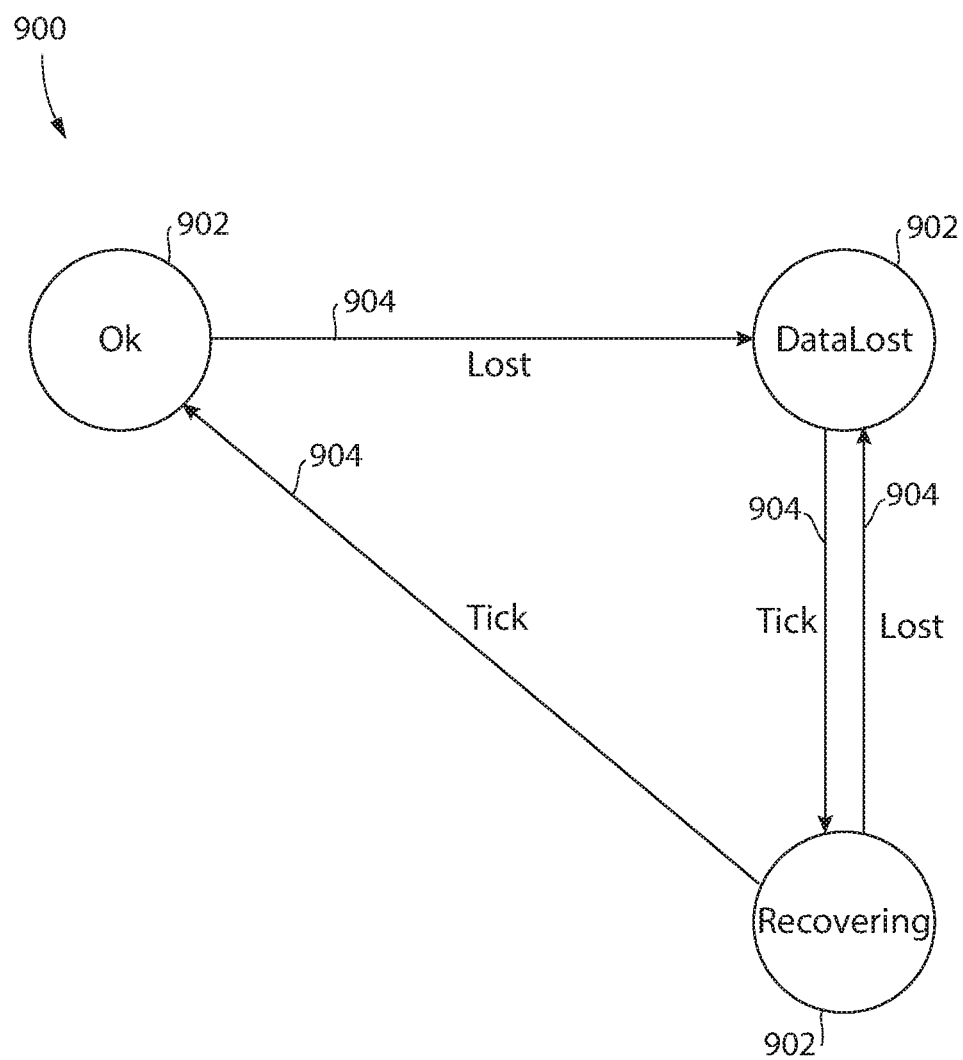
FIG. 9 illustrates a finite state machine implemented by the analysis engine, in accordance with an aspect of the disclosure.

With reference to FIG. 9, an FSM 900 is shown as an example of the FSM implemented by analysis engine 314. The circles 902 represent states of the FSM, directed lines 904 indicate state transitions, with labels provided to indicate the event that caused each state transition.

State Transitions and Actions of FSM 900
Transitions out of Ok
Event: Lost
Next State: DataLost
Actions: forget_dropped_flows Transitions Out of DataLost
Event: Tick
Next State: Recovering
Actions: none
Transitions Out of Recovering
Event: Tick
Next State: Ok
Actions: none
Event: Lost
Next State: DataLost
Actions: forget_dropped_flows
Action: Forget_Dropped_Flows This action walks the entries accumulated in the Subinterval Accumulator and sets the NumFlowrecs variable to SeqHi−SeqLo+1 for each entry.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method of determining dropped aggregated traffic metadata packets that were output from at least one traffic management device to at least one collector device, the method comprising:

receiving summary messages summarizing respective aggregated traffic metadata packets output from the at least one traffic management device and an engine, wherein each traffic management device includes at least one engine, each summary message corresponding to one of the aggregated traffic metadata packets and identifying an origination pair and a sequence number assigned by the origination pair, the origination pair including a traffic management device of the at least one traffic management device and an engine of the traffic management device from which the aggregated traffic metadata packet was output;

tracking per subinterval of a series of sub-intervals, highest and lowest sequence numbers and a count of summary messages received for each unique origination pair from the beginning of the subinterval, each series of subintervals being included within a respective interval of a series of intervals;

accumulating per interval of the series of intervals accumulated highest and lowest sequence numbers and an accumulated count of summary messages for each unique origination pair from the beginning of the interval and for all previous subintervals of the series of subintervals included in the interval for tracking dropped aggregated traffic metadata packets for the interval; and estimating a number of dropped aggregated traffic metadata packets for the interval based on the accumulated highest and lowest sequence numbers and the count of summary messages.

2. The method of claim 1, further comprising:

receiving a data lost notification for one of the subintervals, the data lost notification indicating a data lost event in which information regarding one or more aggregated traffic metadata packets was knowingly discarded from one of the received summary messages due to a full condition of a channel by which the summary messages are received;

adjusting the tracked highest and lowest sequence numbers and a count of summary messages for the subinterval to indicate that the aggregated traffic metadata packets were not dropped during the subinterval.

3. The method of claim 2, further comprising changing states of a state machine to handle and recover from receiving a data lost indication.

4. The method of claim 1, wherein tracking during a current subinterval of a series of subintervals includes attributing a received aggregated traffic metadata packet to either the current subinterval or a previous subinterval of the series of subintervals that precedes the current subinterval based on a comparison of the sequence number of the aggregated traffic metadata packet to the highest sequence number of any of the previous subintervals of the series of subintervals.

5. The method of claim 1, wherein accumulating during a current interval of the series of intervals for a unique origination pair includes updating the accumulated highest and lowest sequence numbers and the accumulated count of summary messages using the highest and lowest sequence numbers and a count of summary messages at the end of each subinterval of the series of subintervals included in the current interval that is not a first subinterval of the series of subintervals included in the current interval.

6. The method of claim 1, wherein accumulating during a current interval of the series of intervals for a unique origination pair includes clearing the accumulated highest and lowest sequence numbers and the accumulated count of summary messages at the end of a first subinterval of the series of subintervals included in the current interval.

7. The method of claim 1, wherein estimating the number of dropped aggregated traffic metadata packets for the interval includes:

setting, for a unique origination pair, an expected summary messages value to equal a difference between the accumulated highest and lowest sequence numbers incremented by one of the unique origination pair; and totaling, for the unique origination pair, for the subintervals included in the interval, a difference between the expected summary messages value and the accumulated count of summary messages.

8. The method of claim 1, further comprising:

processing the summary messages received;

outputting telemetry data about the aggregated traffic metadata packets based on information determined by processing the summary messages; and adjusting an action applied for managing or monitoring network traffic based on the telemetry data.

9. A system to estimate dropped aggregated traffic metadata packets that were output from at least one traffic management device to at least one collector device, the system comprising:

a memory configured to store a plurality of programmable instructions; and at least one processing device in communication with the memory, wherein the at least one processing device, upon execution of the plurality of programmable instructions is configured to:
  receive summary messages output by a summary message generator, the summary messages summarizing respective aggregated traffic metadata packets output from the at least one traffic management device and an engine, wherein each traffic management device includes at least one engine, each summary message corresponding to one of the aggregated traffic metadata packets and identifying an origination pair and a sequence number assigned by the origination pair, the origination pair including a traffic management device of the at least one traffic management device and an engine of the traffic management device from which the aggregated traffic metadata packet was output;
  track per subinterval of a series of sub-intervals, highest and lowest sequence numbers and a count of summary messages received for each unique origination pair from the beginning of the subinterval, each series of subintervals being included within a respective interval of a series of intervals;
  accumulate per interval of the series of intervals accumulated highest and lowest sequence numbers and an accumulated count of summary messages for each unique origination pair from the beginning of the interval and for all previous subintervals of the series of subintervals included in the interval for tracking dropped aggregated traffic metadata packets for the interval; and
  estimate a number of dropped aggregated traffic metadata packets for the interval based on the accumulated highest and lowest sequence numbers and the count of summary messages.

10. The system of claim 9, wherein the at least one processing device, upon execution of the plurality of programmable instructions is further configured to:
  receive a data lost notification for one of the subintervals, the data lost notification indicating a data lost event in which information regarding one or more aggregated traffic metadata packets was knowingly discarded from one of the received summary messages due to a full condition of a channel by which the summary messages are received; and
  adjust the tracked highest and lowest sequence numbers and a count of summary messages for the subinterval to indicate that the aggregated traffic metadata packets were not dropped during the subinterval.

11. The system of claim 10, wherein the at least one processing device, upon execution of the plurality of programmable instructions is further configured to change states of a state machine to handle and recover from receiving a data lost indication.

12. The system of claim 9, wherein tracking during a current subinterval of a series of subintervals includes attributing a received aggregated traffic metadata packet to either the current subinterval or a previous subinterval of the series of subintervals that precedes the current subinterval based on a comparison of the sequence number of the aggregated traffic metadata packet to the highest sequence number of any of the previous subintervals of the series of subintervals.

13. The system of claim 9, wherein accumulating during a current interval of the series of intervals for a unique origination pair includes updating the accumulated highest and lowest sequence numbers and the accumulated count of summary messages using the highest and lowest sequence numbers and a count of summary messages at the end of each subinterval of the series of subintervals included in the current interval that is not a first subinterval of the series of subintervals included in the current interval.

14. The system of claim 9, wherein accumulating during a current interval of the series of intervals for a unique origination pair includes clearing the accumulated highest and lowest sequence numbers and the accumulated count of summary messages at the end of a first subinterval of the series of subintervals included in the current interval.

15. The system of claim 9, wherein estimating the number of dropped aggregated traffic metadata packets for the interval for a unique origination pair includes:
  setting an expected summary messages value to equal a difference between the accumulated highest and lowest sequence numbers incremented by one; and
  totaling for the subintervals included in the interval a difference between the expected summary messages value and the accumulated count of summary messages.

16. The system of claim 9, wherein the at least one processing device, upon execution of the plurality of programmable instructions is further configured to:
  process the summary messages received;
  output telemetry data about the aggregated traffic metadata packets based on information determined by processing the summary messages; and
  adjust an action applied for managing or monitoring network traffic based on the telemetry data.

17. A non-transitory computer readable storage medium and one or more computer programs stored therein, the computer programs comprising instructions, which when executed by a computer system, cause the computer system to:
  receive summary messages output by a summary message generator, the summary messages summarizing respective aggregated traffic metadata packets output from at least one traffic management device and an engine, wherein each traffic management device includes at least one engine, each summary message corresponding to one of the aggregated traffic metadata packets and identifying an origination pair and a sequence number assigned by the origination pair, the origination pair including a traffic management device of the at least one traffic management device and an engine of the traffic management device from which the aggregated traffic metadata packet was output;
  track per subinterval of a series of sub-intervals, highest and lowest sequence numbers and a count of summary messages received for each unique origination pair from the beginning of the subinterval, each series of subintervals being included within a respective interval of a series of intervals;
  accumulate per interval of the series of intervals accumulated highest and lowest sequence numbers and an accumulated count of summary messages for each unique origination pair from the beginning of the interval and for all previous subintervals of the series of subintervals included in the interval for tracking dropped aggregated traffic metadata packets for the interval; and
  estimate a number of dropped aggregated traffic metadata packets for the interval based on the accumulated highest and lowest sequence numbers and the count of summary messages.

18. The non-transitory computer readable storage medium of claim 17, wherein the instructions, when executed by a computer system, further cause the computer system to:
  receive a data lost notification for one of the subintervals, the data lost notification indicating a data lost event in which information regarding one or more aggregated traffic metadata packets was knowingly discarded from one of the received summary messages due to a full condition of a channel by which the summary messages are received; and
  adjust the tracked highest and lowest sequence numbers and a count of summary messages for the subinterval to indicate that the aggregated traffic metadata packets were not dropped during the subinterval.

19. The non-transitory computer readable storage medium of claim 17, wherein tracking during a current subinterval of a series of subintervals includes attributing a received aggregated traffic metadata packet to either the current subinterval or a previous subinterval of the series of subintervals that precedes the current subinterval based on a comparison of the sequence number of the aggregated traffic metadata packet to the highest sequence number of any of the previous subintervals of the series of subintervals.

20. The non-transitory computer readable storage medium of claim 17, wherein accumulating during a current interval of the series of intervals for a unique origination pair includes updating the accumulated highest and lowest sequence numbers and the accumulated count of summary messages using the highest and lowest sequence numbers and a count of summary messages at the end of each subinterval of the series of subintervals included in the current interval that is not a first subinterval of the series of subintervals included in the current interval.

* * * * *